Oct. 23, 1928.
G. BÖHM
THRUST BEARING WITH FLUID FRICTION
Filed Dec. 2, 1925
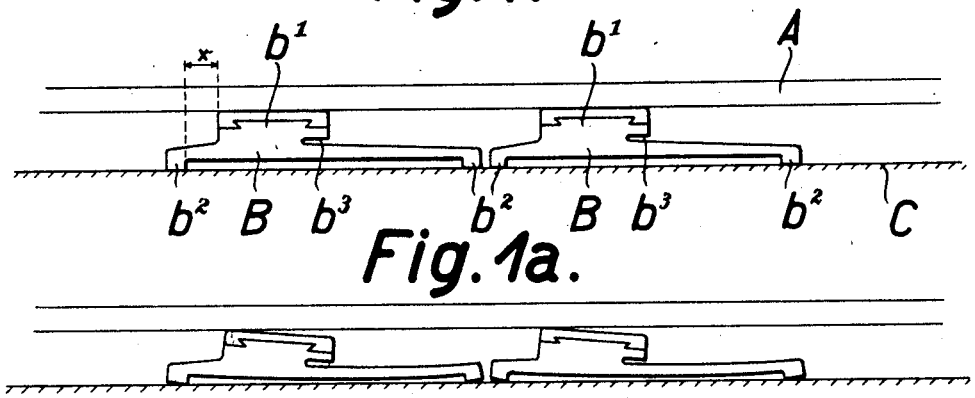
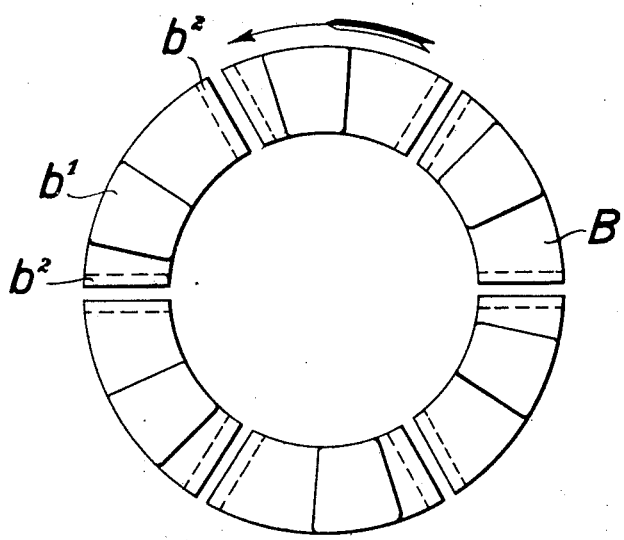
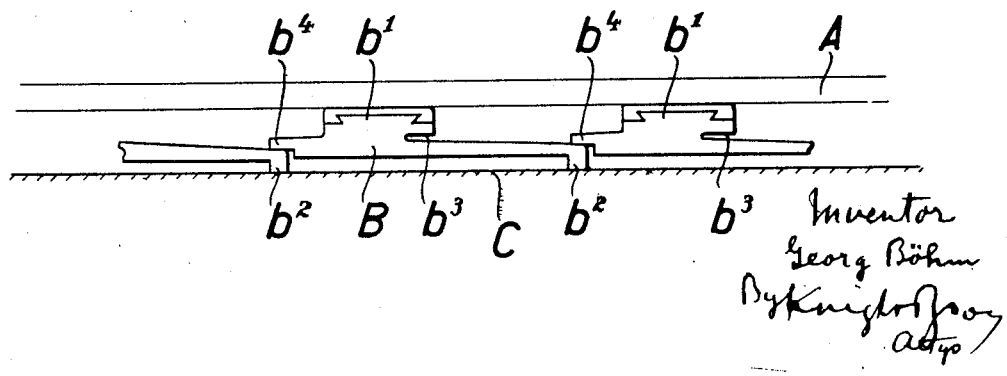

Patented Oct. 23, 1928.

1,688,519

UNITED STATES PATENT OFFICE.

GEORG BÖHM, OF KIEL, GERMANY, ASSIGNOR TO FRIED. KRUPP GERMANIAWERFT AKTIENGESELLSCHAFT, OF KIEL-GAARDEN, GERMANY.

THRUST BEARING WITH FLUID FRICTION.

Application filed December 2, 1925, Serial No. 72,753, and in Germany August 6, 1925.

The invention relates to thrust bearings working with fluid friction and has for its object to improve thrust bearings of this character, as they are described in the copending application Serial Number 730,705, of August 7, 1924.

The invention substantially consists in the fact that each of the thrust segments used in the above-cited thrust bearing is arranged on an individual resilient ring section which is supported like a girder by two supports.

Two embodiments of the subject-matter of the present invention are illustrated in the accompanying drawing by way of example.

Fig. 1 shows a developed thrust bearing in unloaded condition,

Fig. 1ª shows the same bearing in loaded condition,

Fig. 2 shows a top view of the thrust ring of the bearing,

Fig. 3 shows the second embodiment in a view similar to Fig. 1.

The embodiment illustrated in Figures 1, 1ª, 2 will be described first.

A denotes the thrust collar of the shaft not shown, while B denotes the thrust ring of the bearing which rests on the housing C of the bearing. The thrust ring B is composed of a plurality of individual resilient ring sections carrying each a thrust segment $b^1$. These sections B are supported at both ends by a radial supporting rib $b^2$ each. As in the above-cited patent the thrust segments $b^1$ are arranged so as to have a certain distance $x$ from the supporting face of the ribs $b^2$. The thrust segments $b^1$ are separated, by a lateral slit $b^3$, for a certain distance, from the ring section supporting them. This slit, however, is so arranged and dimensioned that the thrust segment $b^1$ remains yet rigid in itself, it has for its purpose merely to increase the acting length of the resilient portion of the ring section B and therewith the elastic deflection of the latter.

If the thrust bearing is loaded, the ring sections B supporting the thrust segments $b^1$ will yieldingly deflect and the latter will assume an inclined position as in the construction of the above-cited patient.

In comparison with this known construction, in which several thrust segments rest on a common resilient thrust ring supported at several places, the construction according to the invention offers the following advantages: By supporting each thrust ring section on two supports only, it is attained firstly that the elastic deformation of the thrust ring section can be very easily calculated. The use of thrust ring sections, further, results in the material being strained only half the amount, in comparison with the former complete ring described in the cited patent, with deflections supposed to be of equal size in both cases, so that the safety in working in the present thrust bearing is considerably increased.

The embodiment illustrated in Fig. 3 differs from that described above only by the fact that every ring section B has a supporting rib only at one of its ends, while the other, offset end $b^4$ rests on the neighboring ring section. This arrangement offers the advantage that one supporting rib is dispensed within each ring section, whereby the free length of the same is increased by the breadth of this supporting rib.

Claims:

1. A thrust bearing with fluid friction, comprising relatively rotatably bearing members, one of which consists of a thrust ring composed of a plurality of resilient ring sections each carrying one bearing shoe rigidly secured thereto, radial supporting ribs arranged at the ends of said ring sections, said bearing shoes being arranged on said ring sections at points off-set from said supporting ribs and being undercut at the point where they are connected to said ring sections in order to increase the operative length of the resilient portion of the latter, said ring sections being more resilient on one side of said shoes than on the other.

2. A thrust bearing with fluid friction, comprising relatively rotatable bearing members, one of which consists of a thrust ring composed of a plurality of resilient ring sections each carrying one bearing shoe rigidly secured thereto, means for supporting said ring sections at their ends, said bearing shoes being arranged on said ring sections at points offset from said supporting means, and being undercut at the point where they are connected to said ring sections in order to increase the operative length of the resilient portion of the latter, said ring sections being more resilient on one side of said shoes than on the other.

3. A thrust bearing with fluid friction, comprising relatively rotatable bearing members, one of which consists of a thrust ring composed of a plurality of resilient ring sections each carrying one bearing shoe rigidly secured thereto, means for supporting said ring sections at their ends, said bearing shoes being arranged on said ring sections at points offset from said supporting means but nearer one end of the ring sections than the other, and being undercut at the point where they are connected to said ring sections in order to increase the operative length of the resilient portion of the latter.

4. A bearing comprising a moving member, a plurality of separate bearing elements each of which comprises a bearing shoe which in itself is rigid and non-yielding, and yielding members between which said shoe is located, said members in conjunction serving to support the shoe at two points to provide a clearance beneath the shoe between the points of support, the supporting member at the forward end of the shoe being adapted to yield prior to the other supporting member for a given load to inaugurate a wedge shaped pocket between the surface of the shoe and the surface of the moving member and both supporting members being adapted to yield for higher loads whereby said wedge shaped space is maintained.

5. A bearing comprising a moving member, a plurality of separate bearing elements each of which comprises a bearing shoe which in itself is rigid and non-yielding, and yielding members between which said shoe is located, said members in conjunction serving to support the shoe between the points of support, both of said supporting members being adapted to yield under the action of the load but the supporting member at the forward end of the shoe being adapted to yield more than the other supporting member for any given load whereby a wedge shaped space is formed and maintained between the surface of the shoe and the surface of the moving member for all loads.

6. A bearing in accordance with claim 4 in which the yielding members are in the form of legs associated with the bearing elements.

7. A bearing in accordance with claim 5 in which the yielding members are in the form of legs associated with the bearing elements.

The foregoing specification signed at Hamburg, Germany, this 19th day of October, 1925.

GEORG BÖHM.